United States Patent [19]
Hager

[11] 3,905,310
[45] Sept. 16, 1975

[54] STOCK RACK WITH PIVOTED TRAYS
[75] Inventor: Clarence H. Hager, Rockford, Ill.
[73] Assignee: Modern Caster Co., Inc., Rockford, Ill.
[22] Filed: Sept. 26, 1974
[21] Appl. No.: 509,451

[52] U.S. Cl. .................. 108/111; 108/2; 108/135
[51] Int. Cl.² ..................... A47F 5/00; A47F 7/04
[58] Field of Search ......... 211/23, 24, 150, 49, 168, 211/169, 170, 99, 47, 90; 108/2, 99, 111, 6–10, 124, 135; 280/47.35; 248/240.4, 242

[56] References Cited
UNITED STATES PATENTS

| | | | |
|---|---|---|---|
| 3,235,093 | 2/1966 | Eisbart et al. | 211/47 |
| 3,390,784 | 7/1968 | Fuchs | 211/169 X |
| 3,596,770 | 8/1971 | Heinrich | 211/170 X |
| 3,680,710 | 8/1972 | Hager | 211/24 |
| 3,762,572 | 10/1973 | Hager | 211/24 |

Primary Examiner—Roy D. Frazier
Assistant Examiner—Robert W. Gibson, Jr.
Attorney, Agent, or Firm—Morsbach & Pillote

[57] ABSTRACT

A stock rack of the type used in tire plants for transporting tread forming blanks and wherein a plurality of trays are supported on upright supports for swinging movement between a generally horizontal position and a raised position. Each tray has a rolled rim along its rear edge and the upright supports have semicircular bearing surfaces at vertically spaced locations therealong which engage the outer surface of the rolled rim intermediate its ends to swingably support the tray. Counterbalancing springs are provided for yieldably holding the trays in a raised position and these springs yieldably press the rolled rim on the rear edge of the trays against the semicircular bearing surfaces.

14 Claims, 8 Drawing Figures

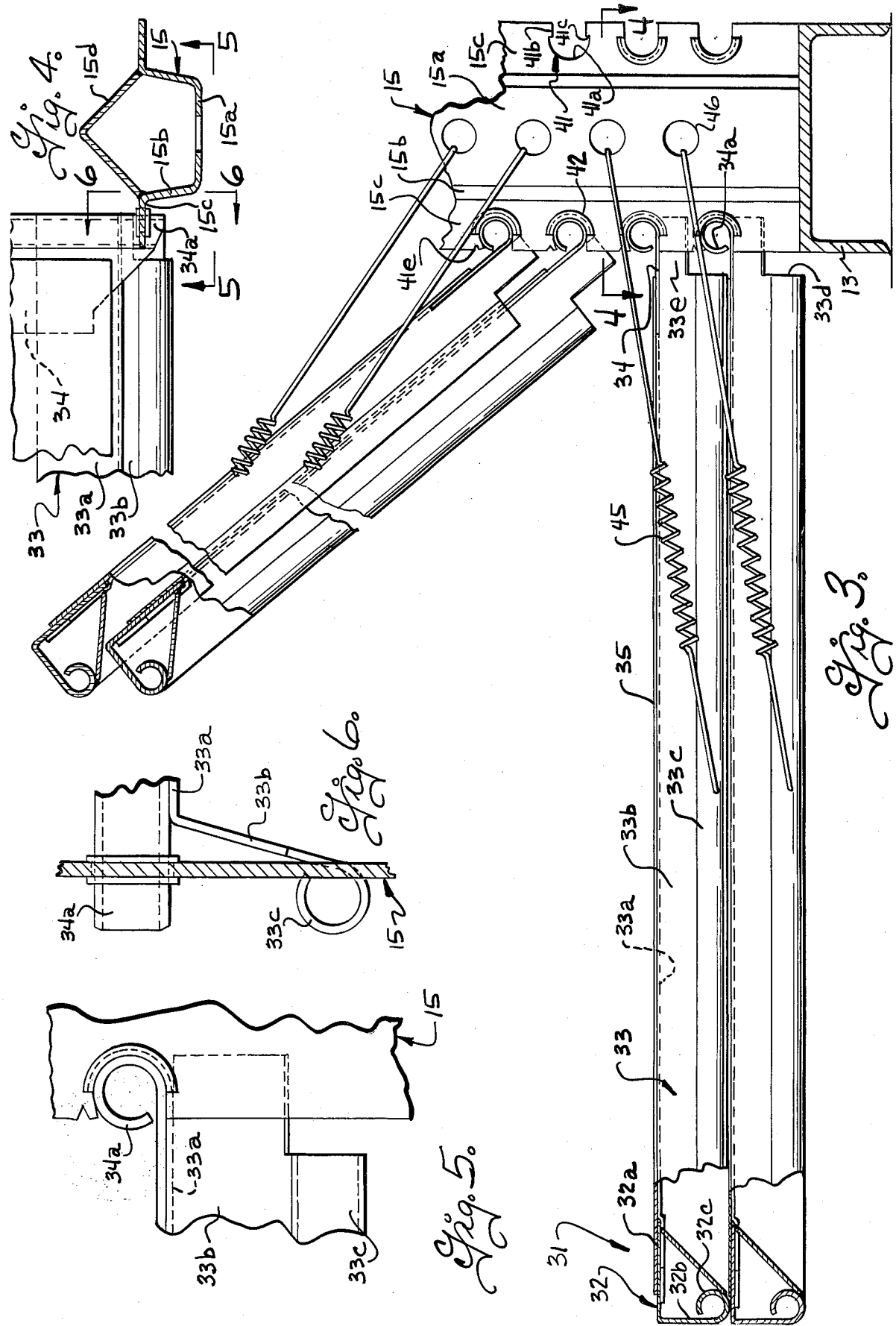

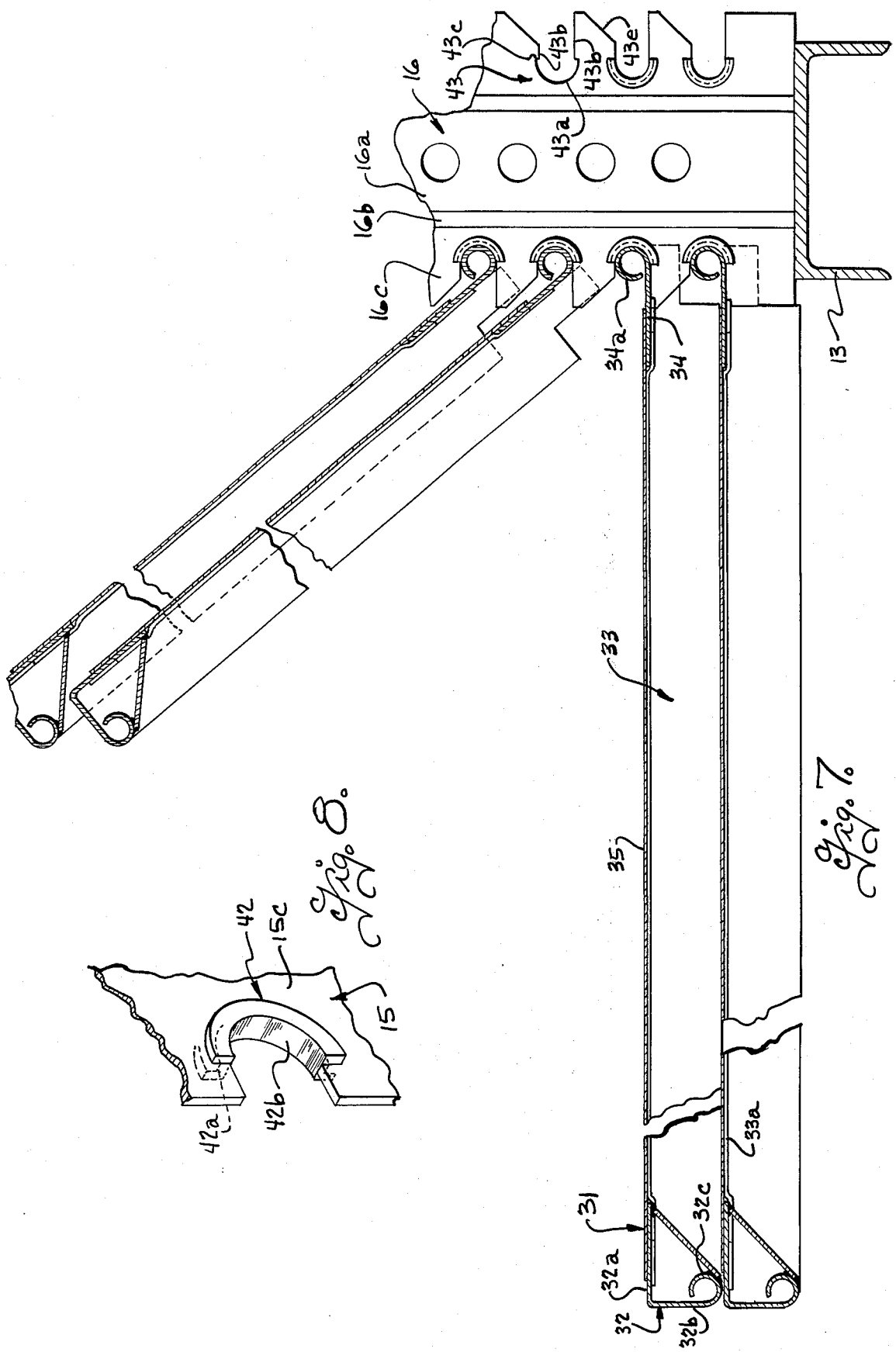

STOCK RACK WITH PIVOTED TRAYS

BACKGROUND OF THE INVENTION

It is presently common practice in automobile tire plants to transport tread forming blanks on wheeled stock racks to the point where the treads are assembled on the tire carcass. The wheeled stock racks include a plurality of trays supported on upright supports for swinging movement between a generally horizontal position and a raised position. The tire treads are carred on the top of the trays and the trays have a depth sufficient to accommodate the tire tread on the subjacent tray. As treads are removed from the top of the trays, the trays are swung to a raised position to allow access to the tread forming blank on the subjacent tray.

The trays must be quite long to accommodate the length of the tread forming blanks and, in order to maximize the number of trays in each stock rack, it is desirable to make the trays as shallow as possible consistent with providing clearance for the tread forming blank on a subjacent tray and also providing adequate strength and rigidity to prevent excessive distortion or even buckling of the tray in use.

In the U.S. Pat. Nos. to Clarence H. Hager 3,680,710 and 3,762,572, assigned to the assignee of the present invention, there are disclosed tire tray constructions in which the trays have a depending flange to space the top of the tray from a subjacent tray and the trays have rolled rims along the lower edges of the front and side flanges and also along the rear edge of the tray to stiffen the tray and avoid sharp edges which could cause injury to the user. In the prior tire trays, however, the trays were hingedly supported only at the ends of the trays by hinge pins that extended through openings in the upright support then into the ends of the rolled rim on the rear edge of the tray. Because of the relatively long length of the trays required for tire treads, there is some tendency for the trays to sag and distort due to weight of the tire treads when the trays were supported only at their ends. Moreover, the use of separate hinge pins not only increases the number of parts but also increases the cost of the assembly operations for assembling the pins on the trays and for thereafter assembling the trays on the supports.

SUMMARY OF THE INVENTION

It is an object of the present invention to overcome the disadvantages of the prior stock racks for tire treads by providing an improved apparatus for swingably supporting the trays for movement between a generally horizontal position and a raised position. Accordingly, the present invention provides a stock rack of the type having a plurality of upright supports and a plurality of superposed trays each mounted on the upright supports for swinging movement about a horizontal axis from a lower position to a raised position and wherein the trays each have a rolled rim of substantially circular cross-sectional configuration extending along their rear edge and at least one upright support is located intermediate the ends of the rolled rim and has semicylindrical bearing surfaces at vertically spaced locations therealong for engaging the outer surface of the rolled rim on a respective one of the trays to swingably support the trays on the support. The continuous rolled rim on the rear edge of the tray rigidifies and reinforces the tray and the semicylindrical bearing surface on at least the intermediate support engages the outer surface of the rolled rim intermediate the ends of the tray to support the tray and inhibit longitudinal buckling or distortion of the elongated trays due to the weight of the tire treads. The trays can also advantageously be supported adjacent their ends by supports having semicylindrical bearing surfaces that engage the outer surface of the rolled rim to eliminate the necessity of separate hinge pins.

The semicylindrical bearing surfaces are advantageously in the form of inserts on the upright which are formed of a bearing material such as a suitable plastic.

These, together with other features and advantages of the present invention will become apparent as the invention becomes better understood from the following detailed description when taken in connection with the accompanying drawings wherein:

FIG. 3 is a fragmentary vertical sectional view taken on the plane 3—3 of FIG. 2, on a larger scale, and illustrating the stock rack with some trays in a lowered position and some trays in a raised position;

FIG. 4 is a fragmentary horizontal sectional view taken on the plane 4—4 of FIG. 3;

FIG. 5 is a fragmentary vertical sectional view taken on the plane 5—5 of FIG. 4 and illustrating the parts on a larger scale;

FIG. 6 is a fragmentary vertical sectional view taken on the plane 6—6 of FIG. 4 and illustrating the parts on a larger scale;

FIG. 7 is a fragmentary vertical sectional view taken on the plane 7—7 of FIG. 2 and illustrating the stock rack with some of the trays in a lower position and some of the trays in a raised position; and FIG. 8 is a fragmentary prospective view illustrating one of the bearing assemblies for the trays.

Figure 1:
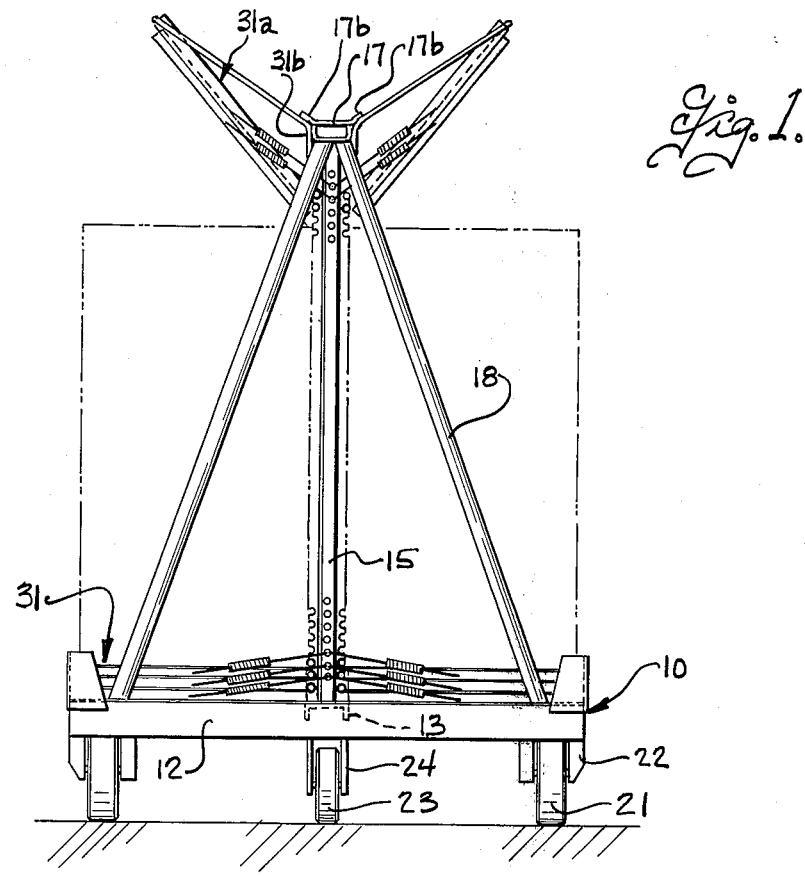
FIG. 1 is an end elevational view of a wheeled stock rack utilizing the improved apparatus for swingably supporting the tire trays and showing some of the trays in their lower position and some of the trays in a raised position.
Figure 2:
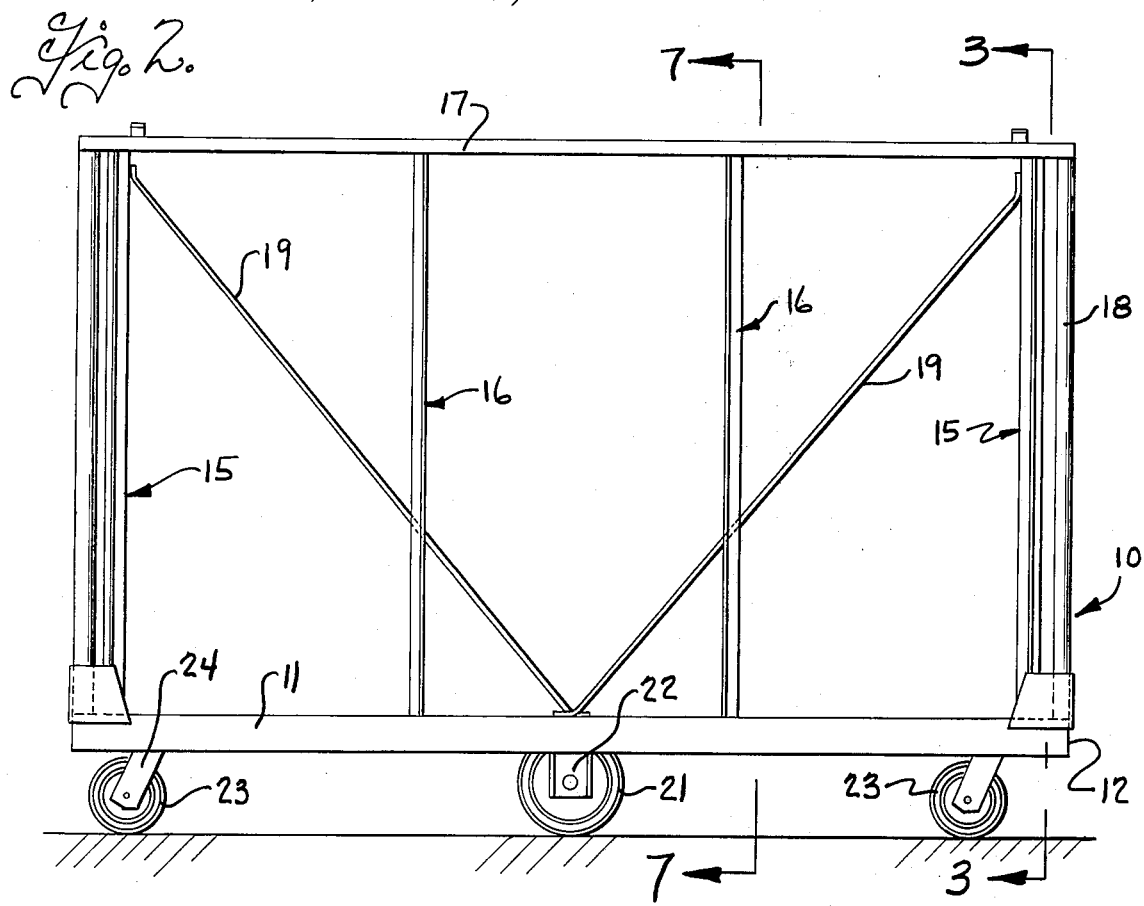
FIG. 2 is a side elevational view of the wheeled stock rack of FIG. 1, with the trays removed to illustrate the frame construction.

The stock rack of the present invention for supporting tread forming blanks is advantageously incorporated in a mobile truck 10 to enable transporting of the tread forming blanks to the station where the treads are assembled on the tire carcass. In general, the truck includes a rigid frame having spaced side and end members 11 and 12 respectively, conveniently of channel shape cross-section, and rigidly interconnected at the corners of the frame. An intermediate frame member 13, also conveniently of channel shape cross-section, extends between the end members 12 and generally parallel to the side members 11. Upright end supports 15 are mounted on the intermediate frame member 13 adjacent opposite ends of the truck and one or more intermediate upright supports 16 are also mounted on the intermediate frame member 13 at locations intermediate the ends of the truck. The upper ends of the end and intermediate supports 15 and 16 are interconnected by a header 17 and the upper ends of the supports are braced against movement crosswise of the mobile truck by end braces 18. The frame members are also braced against movement lengthwise of the truck by intermediate brace members 19, conveniently in the form of rods attached to the upper ends of the end supports 15 and extending diagonally downward toward the intermediate frame member 13, as best shown in FIG. 2. As shown in FIGS. 1 and 2, the mobile truck is supported by wheels arranged in any suitable configuration. In the specific embodiment shown, a pair of intermediate wheels 21 are rigidly supported by brackets 22 on the side frame members 11, and a pair of castor wheels 23 are swivelly supported by castor brackets 24 on the intermediate frame member 13, adjacent opposite ends of the truck. Other wheel configurations can be utilized if desired.

The stock rack includes a plurality of elongated trays 31 for receiving and supporting tread forming blanks. The trays are mounted on the upright supports 15 and 16 for movement between a generally horizontal position and a raised position. Some mobile trucks are formed with a single set of trays which are mounted at only one side of the upright supports 15 and 16. However, in the preferred embodiment illustrated, two sets of trays are provided, one at each side of the truck, and the trays are supported at relatively opposite sides of the upright supports 15 and 16. The uppermost tray 31a (FIG. 1) is advantageously provided with brackets 31b that project above the tray and are arranged to engage stops 17b on the top rail to limit upward swinging movement of the trays, as shown in FIG. 1.

As more fully disclosed in the aforementioned U.S. Pat. No. 3,762,572 to which reference is made for a more complete disclosure, the trays are similarly constructed and each includes a front frame member 32 of generally L-shaped cross-section, side frame members 33 also generally L-shaped cross-section extending rearwardly from the front frame member, and a rear frame member 34 extending between the rear ends of the side frame members. The front frame members 32 of the trays have a generally horizontal upper leg 32a, a generally vertical front leg 32b and preferably have a rolled rim 32c at their lower edge to rigidify the front frame member and to also avoid exposure of sharp edges. The side frame members 33 also include a generally horizontal upper leg 33a which is secured as by rivets or welding to the horizontal leg 32a of the front frame member, and a side leg 33b that is preferably inclined downwardly and outwardly from the upper leg 33a and which terminates at its lower edge in a preferably rolled rim 33c. The rear frame members 34 of the trays are generally flat and are secured, as by rivets or welding to the upper legs 33a of the side frame members 33, adjacent the rear ends of the latter, and the rear frame members 34 have a rolled rim 34a along the rear edge thereof. The rolled rim 34a at the rear edge of the tray has a circular cross-sectional configuration and is preferably disposed above the plane of the top of the tray. A flat top, preferably of a noncorrosive material such as sheet aluminum or the like, is attached as by riveting to the top flanges on the front side and rear frame members to provide a support surface for the tread forming blanks.

As best shown in FIGS. 3 and 7, the depending flanges on the front frame members of each tire tray engage the top of the subjacent tray when the latter are in a generally horizontal position and space the trays apart a distance sufficient to accommodate a tread forming blank on the subjacent tray. The trays are swingable to a raised position to allow removal of a tread forming blank on the top of a subjacent tray. The side flanges 33b on the side frame members of each tray diverge outwardly so as to allow partial nesting of the trays when the latter are in their raised position, as shown in the upper portion of FIGS. 3 and 7.

The tire trays 31 for the tread forming blanks are relatively long to accommodate the length of the blank and sometimes tend to sag or distort under the weight of the tread forming blanks. In accordance with the present invention, the elongated pair of trays are swingably supported not only adjacent opposite ends, but also at one or more locations intermediate their ends. This is achieved while still utilizing a continuous rolled rim 34a on the rear edge of the trays, by the provision of semicylindrical bearing surfaces on the upright supports 15 and 16 that engage the outer surface of the rolled rim.

The end upright supports 15 are conveniently of channel shape configuration and, as best shown in FIG. 4, include a web portion 15a and laterally extending leg portions 15b with flanges 15c extending laterally from the leg portions 15b. As also shown in FIG. 4, an angle iron 15d is advantageously welded to the legs of the channel 15 to further stiffen and rigidify the same.

The flanges 15c on the end uprights extend in a plane perpendicular to the longitudinal axis of the rolled rim on the rear edge of the trays and the flanges have generally U-shaped notches 41 vertically spaced apart therealong a distance corresponding to the height of the tray when the latter are in a horizontal position. As shown in FIG. 3, the notches 41 have a semicircular base portion 41a and leg portions 41b that extend from the semicircular base to the outer edge of the flange and which are spaced apart a distance less than the diameter of the semicircular base to define stop faces 41c. Semicircular bearing inserts 42 are disposed in each of the notches and have a peripheral recess or groove 42a for receiving the flange 15c, and the ends of the bearing or inserts engage the stop faces 41c on the flange so as to be retained against rotation or lateral movement out of the notches. The bearing inserts 42 define a generally cylindrical bearing surface 42b which is wider than the flange 15c and the bearing surface on the inserts, when mounted in the uprights, have a diameter generally corresponding to the outer diameter of the rolled rim on the trays to rotatably support the same. The rolled rims on the rear edge of the tray are formed from steel and the bearing inserts are formed of a suitable bearing material having good wear characteristics with steel. The bearing inserts may, for example, be formed of a resilient plastic having good wear characteristics, for example nylon. The resilient plastic inserts will radially deform sufficient to allow pressing of the same into the notches and will then snap into position behind the stop bases 41c. In the embodiment illustrated, the legs 41b of the notches are spaced apart a distance corresponding to the diameter of the rolled rim 34a on the tray and extend generally tangent to the bearing surface 42b in the inserts to guide the rolled rim on the tray into the bearing surface. After the rolled rims on the trays are inserted into the bearing surfaces, the flanges 15c are preferably deformed to partially close the notches 41 sufficient to retain the rolled rim in the bearing surface. This is conveniently achieved by striking the flange 15c with a chisel or the like above the notch 41c, as indicated at 41e, to deform a portion of the flange downwardly against the outer face of the roller rim.

The intermediate supports 16 can conveniently be formed similar to the end supports 15 and, as best shown in FIG. 7, include a web portion 16a, laterally extending leg portions 16b, and flanges 16c extending laterally from the leg portions 16b and perpendicular to the rolled rim on the rear edge of the trays. The flanges 16c on the intermediate supports 16 are preferably made somewhat deeper than the corresponding flanges 15c on the end supports and notches 43 similar to the aforementioned notches 41 are provided at vertically spaced locations along the flanges 16c. The notches 43 also have a semicircular base 43a and leg portions 43b which are spaced apart a distance less than the diameter of the semicircular base of the notch. The lower one of the legs 43b on each notch extends generally horizontally and tangent to the bearing surface on the inserts 42 to form an extended support for the rolled rim on the tray, in the event the rolled rim shifts out of the bearing insert due to warpage or distortion. In order to provide clearance for the tray when the latter is in its raised position, the upper leg 43b is cut away as indicated at 43e to diverge at an angle relative to the lower leg of each notch. Bearing inserts 42, conveniently the same as those described in connection with the end supports, are provided at each of the notches in the intermediate supports 16.

Tension springs are provided for yieldably supporting the trays in a raised position and, as described in the aforementioned U.S. Pat. Nos. 3,680,710 and 3,762,572, the tension springs 45 are attached at one end of each of the trays and at the other end to a respective one of the end supports 15 at a location somewhat above the pivot axis of the tray to apply a lifting force to the tray for holding the same in a raised position. The springs 45 have hooks at one end which extend into openings 46 in the end supports and hooks at the other end which are either attached directly to the trays or to adjustable brackets on the side edges of the trays as disclosed in U.S. Pat. No. 3,762,572. As will be seen, the tension springs also urge the trays rearwardly to yieldably hold the rolled rim on the rear edge of the trays against the bearing surfaces 42b.

As best shown in FIG. 4, the rolled rim 34a on the rear edge of the tray extends beyond the ends of the tray for reception in the bearings on the end uprights, and the side frame members on the tray are notched at 33d adjacent their rear ends so that a portion of the side frame members shown at 33e overlaps the inner wall of the end support members 15, when the tray is in its lowered as well as in its raised position, to inhibit endwise movement of the trays relative to the supports.

From the foregoing it is through that the construction and operation of the tire tray stock rack will be readily understood. The tire trays are formed with a rolled rim along their rear edge and the uprights are formed with semicircular bearing surfaces that rotatably engage the outer surface of the rolled rim to swingably support the trays. This allows the use of intermediate supports 16 for rotatably supporting the trays intermediate their ends and which intermediate supports inhibit longitudinal saging or buckling of the trays when weight is applied. Moreover, the use of the semicircular being surfaces on the end supports 15 which engage the outer surface of the rolled rim on the rear edge of the tray adjacent each end eliminates necessity of separate hinge pins. Further, the bearing inserts can be formed of a material having good wear resistance characteristics with the steel rolled rim on the rear edge of the tray so as to minimize wear. The counterbalancing springs aid in holding the rolled rim on the rear edge of the trays against the bearing surfaces and the trays can be locked against withdrawal from the notches in the uprights by deforming the uprights above the rolled rims.

The embodiments of the invention in which an exclusive property or privilege is claimed are defined as follows:

1. In a stock rack of the type having spaced upright supports and a plurality of superposed trays each mounted on the spaced upright supports for swinging movement about a horizontal axis adjacent a rear edge of the tray from a lower position through an arc of less than 180° to a raised position; the improvement wherein each tray has a rolled rim of substantially circular cross-sectional configuration extending along said rear edge of the tray, said upright supports being located intermediate the ends of the rolled rim on the trays and each having means defining a plurality of semicylindrical bearing surfaces at vertically spaced locations therealong engaging the outer surface of the rolled rim on a respective one of the trays to swingably support the trays on the upright supports.

2. A stock rack according to claim 1 including a tension spring at each end of each tray, each tension spring attached to a respective tray forwardly of its rear edge and to an adjacent upright support for yieldably holding the tray in a raised position and for yieldably urging the tray in a rearward direction to press the rolled rim on said one edge of the tray against a respective one of the semicircular bearing surfaces on the upright supports.

3. A stock rack according to claim 1 wherein each tray includes a generally flat top wall, a depending front flange along the front edge of the tray, and depending side flanges along opposite side edges of the tray, said side flanges having rear portions extending alongside said upright supports at least where said trays are in their lower position to inhibit endwise movement of the trays relative to the upright supports.

4. A stock rack according to claim 3 wherein said rear portions of said flanges on the trays extend alongside the inner faces of the upright supports and said rolled rim on the rear edge of the tray extends axially beyond said rear portion of the side flanges on the respective tray.

5. A stock rack according to claim 1 wherein said spaced upright supports include a pair of end upright supports having said semicircular bearing surfaces engaging the rolled rims on said trays adjacent opposite ends of the trays and at least one intermediate upright support having said semicircular bearing surfaces engaging the rolled rims on the trays at a location intermediate the end supports.

6. A stock rack according to claim 1 wherein said upright supports each have a flange section disposed in a plane transverse to said horizontal axis of the trays and generally U-shaped notches extending inwardly from the edge of the flange section at vertically spaced locations therealong said means defining said semicylindrical bearing surfaces comprising inserts of bearing material disposed in said notches in the flange sections of the uprights and having said semi-cylindrical bearing surfaces at the inner surface thereof.

7. A stock rack according to claim 6 wherein said inserts of bearing material have a groove in the outer surface thereof receiving the flange section of the upright supports adjacent the notches to inhibit axial movement of the inserts relative to the upright supports.

8. A stock rack according to claim 6 wherein said inserts of bearing material are disposed adjacent the base of the notches in the flange section of the upright supports and said notches have inwardly extending abutment shoulders engaging the bearing inserts to retain the inserts in the notches.

9. A stock rack according to claim 6 wherein said bearing material is a resilient plastic.

10. A stock rack according to claim 6 wherein said notches in at least one upright support have wall portions adjacent the outer ends of the notches spaced apart a distance less than the diameter of the rolled rim on the rear edge of the tray to retain the tray in the notches.

11. A stock rack according to claim 6 wherein each tray includes a generally flat top wall and said rolled rim on the rear edge of the tray extends above the top wall of the tray, and said notches each have a generally horizontal bottom wall extending generally tangent to said semicircular bearing surface.

12. A stock rack according to claim 1 wherein each tray includes a generally flat top wall and said rolled rim on the rear edge of each tray extend above the top wall of the tray.

13. In a stock rack of the type having spaced upright supports and a plurality of superposed trays each swingably mounted on the spaced upright supports for swinging movement about a horizontal axis adjacent the rear edge of the tray from a lower position through an arc of less than 180° to a raised position; the improvement wherein the truck has a pair of end upright supports adjacent opposite ends of the trays and at least one intermediate support intermediate the ends of the trays, each tray having a rolled rim of substantially circular cross-sectional configuration extending along the rear edge of the tray, at least said intermediate support having means defining a plurality of semicircular bearing surfaces at vertically spaced locations therealong each engaging the outer surface of the rolled rim on a respective one of the trays to swingably support the trays intermediate their ends on the intermediate upright support.

14. A stock rack according to claim 13 wherein said intermediate support has a flange section disposed in a plane transverse to said horizontal axis of the trays and generally U-shaped notches extending inwardly from the edge of the flange section, said means defining said semicylindrical bearing surfaces comprising inserts of bearing material disposed in notches in the flange sections of the intermediate upright and having said semicylindrical bearing surface at the inner side thereof.

* * * * *